United States Patent [19] [11] 3,954,527
Sayles [45] May 4, 1976

[54] SOLID PROPELLANT WITH IRON-CARBONYL CONTAINING POLYMER BINDER

[75] Inventor: David C. Sayles, Huntsville, Ala.

[73] Assignee: The United States of America as represented by the Secretary of the Army, Washington, D.C.

[22] Filed: Mar. 24, 1970

[21] Appl. No.: 24,896

[52] U.S. Cl. .............................. 149/19.2; 149/19.9; 149/20
[51] Int. Cl.[2] .............................. C06B 45/10
[58] Field of Search .............. 149/19, 109, 19.2, 19.9, 149/20

[56] References Cited

UNITED STATES PATENTS

| | | | |
|---|---|---|---|
| 3,322,804 | 5/1967 | Pruett | 149/109 X |
| 3,341,495 | 9/1967 | Neuse | 149/109 X |
| 3,447,981 | 6/1969 | Sayles | 149/19 |

*Primary Examiner*—Edward A. Miller
*Attorney, Agent, or Firm*—Nathan Edelberg; Robert P. Gibson; Jack W. Voigt

[57] ABSTRACT

Polybutadiene-iron carbonyl complexes are useful as the binder-catalyst for fast-burning rate propellants which are additionally comprised of ammonium perchlorate, aluminum powder, curative-cross-linking agent, and additive (e.g., wetting agents, grinding aids, etc.). The complexes, which are regarded as copolymers of uncomplexed polybutadiene and tricarbonyl(-diene)-iron units $[C_8H_{12}Fe(CO)_3]_x$ (where x is one or multiples of one), can be utilized as a high burning rate additive or as a plasticizer for carboxylated polybutadiene binder materials, such as, polybutadiene acrylic acid, polybutadiene acrylic acid-acrylonitrile, carboxyl-terminated polybutadiene, and hydroxy- or epoxy-terminated polybutadiene. The various binder materials, such as those set forth above, can be reacted with the polycarbonyl-iron directly to yield a prepolymer which can be used as the binder-catalyst for propellants containing, an oxidizer, metal fuel, curative-cross-linking agent, and additives.

8 Claims, No Drawings

SOLID PROPELLANT WITH IRON-CARBONYL CONTAINING POLYMER BINDER

DEDICATORY CLAUSE

The invention described herein may be manufactured, used, and licensed by or for the Government for governmental purposes without the payment to me of any royalties thereon.

BACKGROUND OF THE INVENTION

Burning rate catalysts for solid propellants have included inorganic oxides, such as, iron oxide, copper chromite, and organometallic compounds, such as, ferrocene and substituted ferrocenes. More recently, carborane and carborane derivatives have been employed as catalyst material for propellants.

A large portion of the prior art effort dealing with burning rate catalysts has been devoted to preventing losses of liquid catalyst material due to volatilization during the processing and due to migrating during storage of propellant. The solid additives in the form of metallic oxides created problems in the area of mixing to produce a homogeneous product. Also the use of solid additive material caused a loss of mechanical properties of propellants. Good mechanical properties are essential for high burning rate applications.

A catalyst material which comprises a polymeric material capable of being cured to form a stable binder-catalyst for solid propellant would be of particular interest.

Therefore, an object of this invention is to provide solid propellant compositions which utilize a polymeric binder-catalyst material which is capable of undergoing cure to form the stable binder for the propellant.

A further object is to provide solid propellant compositions which utilize a polymeric binder-catalyst material to serve as complete replacement for the binder, curing catalyst, and burning rate catalyst for prior art high burning rate propellant.

SUMMARY OF THE INVENTION

A copolymer of uncomplexed polybutadiene and butadiene-tricarbonyliron units is used as a high burning rate additive or plasticizer for carboxylated polybutadiene binders, such as, polybutadiene acrylic acid, polybutadiene acrylic acid-acrylonitrile, carboxyl-terminated polybutadiene, hydroxy-terminated polybutadiene, and the like. Preferably, a binder of the type set forth is selected for reaction with the polycarbonyliron directly to yield a prepolymer comprised of the selected binder and butadiene-iron carbonyl complexes. The prepolymer is used to replace the binder, curing promoters, such as, iron linoleate, and the burning rate catalyst which are presently used in state-of-the-art propellant compositions.

The propellants of this invention are comprised of ammonium perchlorate 50–70 weight percent, aluminum 5–20 weight percent, curatives 1–2 weight percent, and trace amount (0.1–0.3 weight percent) processing aid (e.g., lecithin). The copolymer or prepolymer of polybutadiene-iron carbonyl complexes is employed in amounts from about 10–20 weight percent. Since no additional catalyst (burning rate or curing) need be incorporated, the propellant can be compounded to contain a higher percent of binder. Higher binder content results in improved mechanical properties. By eliminating the normally used burning rate catalyst, n-butylferrocene, the problem of migration of the specified catalyst is eliminated.

The prepolymer binder-catalyst may be used as an additive (for catalyst or plasticizer function) in a propellant composition containing a binder material selected from polybutadiene acrylic acid, polybutadiene acrylic acid-acrylonitrile, carboxyl-terminated polybutadiene, hydroxyl-terminated polybutadiene, and epoxy terminated polybutadiene. The combined amount of the binder material and prepolymer binder-catalyst is preferably about 20 weight percent of the propellant composition. The prepolymer binder-catalyst is used in amounts from about 5 to about 15 weight percent while the balance of the combined amount, of about 20 weight percent, is made up of the binder material which is selected from the group of binder materials set forth above.

DESCRIPTION OF THE PREFERRED EMBODIMENTS

The product of reaction formed when uncomplexed polybutadiene and butadiene-tricarbonyliron units are reacted is depicted by the structure set forth below. The depicted structure has an empirical formula of $[C_8H_{12}Fe(CO)_3]_x$:

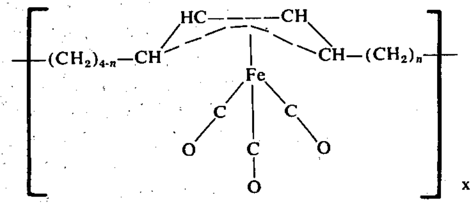

where n=0–4; x=one or multiples of one.

It has been discovered that the product depicted above (which is a copolymer of uncomplexed polybutadiene and butadiene-tricarbonyliron units) may be used as the complete binder, burning rate catalyst, and plasticizer for high burning rate propellant.

Set forth below in Table I is a representative high-burning rate propellant (Composition A) and a representative formulation (Composition B) which contains a carboxyl terminated polybutadiene-iron carbonyl complex.

TABLE I

| INGREDIENT | COMPOSITION A | COMPOSITION B |
|---|---|---|
| Carboxyl-terminated polybutadiene prepolymer | 9.7 | — |
| Carboxyl-terminated polybutadiene iron carbonyl complex prepolymer | — | 16.9 |
| Tris(methylaziridinyl)phosphine oxide | 0.5 | 0.5 |
| Triglycidyl derivative of para-aminophenol | 0.5 | 0.5 |
| Iron linoleate | 0.2 | — |
| Lecithin | 0.1 | 0.1 |
| n-Butylferrocene | 7.0 | — |
| Aluminum | 14.0 | 14.0 |
| Ammonium Perchlorate (6μ) | 13.6 | 13.6 |
| Ammonium Perchlorate (4μ) | 54.4 | 54.4 |
| TOTALS | 100.0 | 100.0 |

A typical complexed polybutadiene polymer is prepared by reacting polybutadiene with pentacarbonyliron or dodecacarbonyliron in a variety of hydrocarbon solvents at 25–150°C, (e.g., dioxane-xylene, ethanol-benzene, benzene, 1,2-dimethoxyethane-benzene, and the like).

Xylene or xylene-containing solvents are preferred when pentacarbonyliron is used. Benzene or benzene-containing solvents are preferred when dodecacarbonyliron is used. A polar, nonacidic solvent component, such as an alcohol, ketone, or ether is preferably employed in a few percent (in conjunction with xylene or benzene) to prevent molecular weight breakdown of the polymer. Chemistry of Polybutadiene-Iron Carbonyl Systems by M. Berger and T. A. Manuel, Journal of Polymer Science Part A-1, Vol. 1, 1509–1516 (1966) provides a more detailed treatment of the chemical behavior and the analytical data observed from further testing of the polymer. The cited publication also provides procedures for preparing the polybutadiene-iron carbonyl complexes.

Typical preparative procedures for preparing the copolymer of polybutadiene-iron carbonyl complexes utilized in this invention are set forth below under Examples 1 and 2.

EXAMPLE I

In a typical experiment a solution of 3.5g. (65 mmole) of polybutadiene in benzene (315 ml.) is mixed with $Fe_3(CO)_{12}$ (8.0g., 16 mmole) and 1,2-dimethoxyethane(35 ml). This mixture is refluxed under nitrogen for 3½ hours, cooled and added dropwise to a stirred mixture of ethanol (11.95%) with concentrated hydrochloric acid (50 ml.), giving a clear yellow solution and a rubbery yellow product. The portion of the rubbery product composed of $[C_8H_{12}Fe(CO)_3]_x$ units is about 38% by weight. Combustion analysis for iron indicated the presence of 36% by weight $[C_8H_{12}Fe(CO)_3]_x$ units, corresponding to 20% by weight of $Fe(CO)_3$ units.

EXAMPLE II

In another typical experiment a solution of 3.5g. (65 mmole) of polybutadiene in 320 ml. of benzene is mixed with 3.0g. (6 mmole) of $Fe_3(CO)_{12}$ and 40 ml. of glacial acetic acid. The mixture is stirred under nitrogen in a bath at 22–33°C. The product is separated as a white polymer when the mixture is dropped into a stirred mixture of 500 ml. of acetone with 10 ml. of concentrated HCl.

When a large excess of iron carbonyl is reacted with polybutadiene, up to 80% of the double bonds present have been utilized in complex formation of the high molecular weight copolymer. The high molecular weight iron carbonylcontaining polymers are yellow to orange in color, depending upon the degree of complexing reached.

The preferred high molecular weight copolymer for use in this invention has a high percent of the double bonds complexed. The copolymer or prepolymer is easily blended with specified propellant ingredients. The control propellant, Composition A, and the novel propellant, Composition B, were each mixed, cast, and cured in a like manner by techniques known in the art.

A typical procedure for mixing the propellants is to blend a portion of the ammonium perchlorate oxidizer in the polybutadiene binder material to produce a paste. Next, the ballistic modifiers and additives (e.g., lecithin, ferrocene, iron linoleate, etc.) are added to the paste at about 140°F followed by the addition of aluminum and the remainder of the ammonium perchlorate. The remainder of the ammonium perchlorate and aluminum are added slowly in increments with good mixing between additions in a vertical mixer under reduced pressure. Finally, the curing agents, crosslinking agents, and other optional additives are added to the propellant which is given an additional 1 hour mix under reduced pressure at 140°F. The propellant is cast into a suitable mold and cured at 140°F for about 24 hours.

I claim:

1. A propellant composition comprised of ammonium perchlorate, aluminum, curatives selected from tris(methylaziridinyl)phosphine oxide and triglycidyl derivative of para-aminophenol, lecithin, and a prepolymer binder-catalyst comprised of polycarbonyliron complexes which have been reacted directly with polybutadiene to yield a product represented by the following structure:

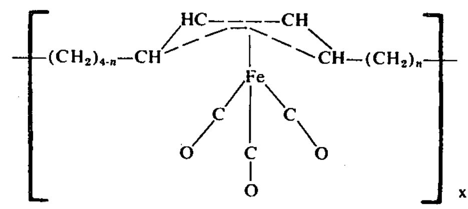

where n=o–4; x=one or multiples of one.

2. The propellant composition of claim 1 wherein said ammonium perchlorate is present in amounts from about 50–70 weight percent of said propellant composition; said aluminum is present in amounts from about 5-20 weight percent of said propellant composition; said curatives are present in amounts from about 1–2 weight percent of said propellant composition said lecithin is present in amounts from about 0.1 – 0.3 weight percent of said propellant composition and said prepolymer binder-catalyst is present in amounts from about 10-20 weight percent of said propellant composition.

3. The propellant composition of claim 2 wherein said ammonium perchlorate is present in an amount of about 68 weight percent of said propellant composition, said weight percent being comprised of about 13.6 weight percent of 6 micron-size ammonium perchlorate and of about 54.4 weight percent of 4 micronsize ammonium perchlorate; said aluminum is present in an amount of about 14 weight percent of said propellant composition; said curatives are comprised of about 0.5 weight percent of tris(methylaziridinyl)phosphine oxide and of about 0.5 weight percent of triglycidyl derivative of para-aminophenol, said weight percent being based on weight percent of said propellant composition; said lecithin is present in an amount of about 0.1 weight percent of said propellant composition; and said prepolymer binder-catalyst is carboxyl-terminated polybutadiene-iron carbonyl complex prepolymer which is present in an amount of about 16.9 weight percent of said propellant composition.

4. The propellant composition of claim 1 wherein a binder material is included in said propellant composition as an additional ingredient, said binder material being selected from carboxyl-terminated polybutadiene, polybutadiene acrylic acid, polybutadiene acrylic acidacrylonitrile, hydroxyl-terminated polybutadiene, and epoxy-terminated polybutadiene.

5. The propellant composition of claim 4 wherein said binder material and said prepolymer bindercatalyst are present in a combined amount of about 20 weight percent of said propellant composition, said prepolymer binder-catalyst being present in amounts from about 5 to about 15 weight percent of the propellant composition while the balance of said combined amount of about 20 weight percent is said selected binder material.

6. A propellant composition comprised of ammonium perchlorate in an amount from about 50–70 weight percent of said propellant composition; aluminum in an amount from about 5–20 weight percent of said propellant composition; curatives selected from tris(methylaziridinyl)phosphine oxide and triglycidyl derivative of para-aminophenol in amounts from about 1–2 weight percent of said propellant composition; lecithin in an amount from about 0.1–0.3 weight percent of said propellant composition; and a prepolymer binder-catalyst which is a reaction product formed from reacting polycarbonyl-iron directly with a binder material selected from the group consisting of polybutadiene acrylic acid, polybutadiene acrylic acid-acrylonitrile, carboxyl-terminated polybutadiene, hydroxy-terminated polybutadiene, and epoxy-terminated polybutadiene, said prepolymer bindercatalyst being present in amounts from about 10-20 weight percent of said propellant composition.

7. The propellant composition of claim 6 wherein a binder material is included in said propellant composition as an additional ingredient, said binder material being selected from carboxyl-terminated polybutadiene, polybutadiene acrylic acid, polybutadiene acrylic acidacrylonitrile, hydroxyl-terminated polybutadiene, and epoxy-terminated polybutadiene.

8. The propellant composition of claim 7 wherein said binder material and said prepolymer binder-catalyst are present in a combined amount of about 20 weight percent of said propellant composition, said prepolymer binder-catalyst being present in amounts from about 5 to about 15 weight percent of the propellant composition while the balance of said combined amount of about 20 weight percent is said selected binder material.

* * * * *